Aug. 21, 1962    R. P. SWEGER ETAL    3,050,257
MEANS FOR OPERATING A VALVE OR THE LIKE IN
ACCORDANCE WITH A CONTROLLED CONDITION
Filed March 13, 1959    2 Sheets—Sheet 1

INVENTORS
William G. Young
Russell P. Sweger
Alfred A. Horton
BY Wolfe, Hubbard
Voit & Osann
ATTORNEYS Aug. 21, 1962 R. P. SWEGER ETAL 3,050,257
MEANS FOR OPERATING A VALVE OR THE LIKE IN
ACCORDANCE WITH A CONTROLLED CONDITION
Filed March 13, 1959 2 Sheets-Sheet 2
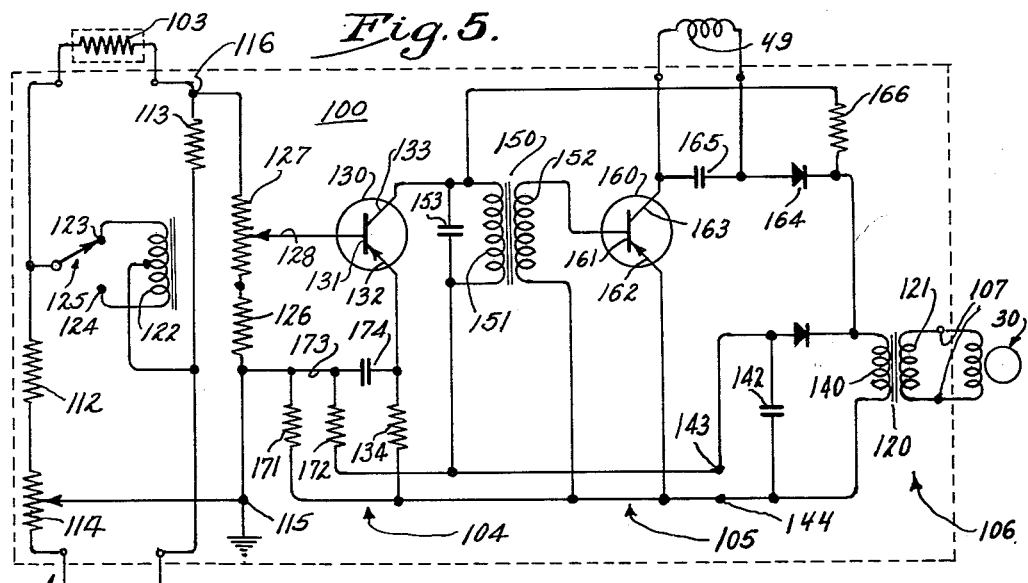
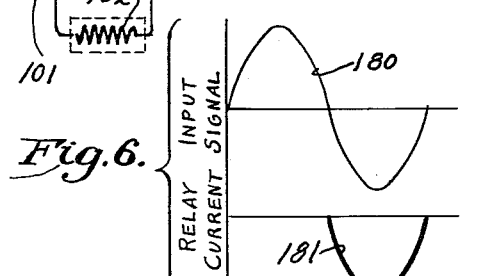
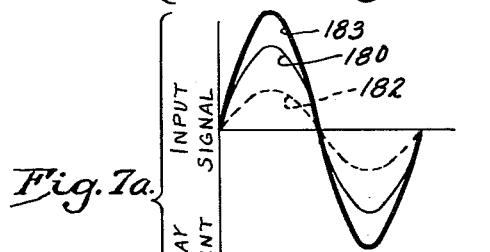
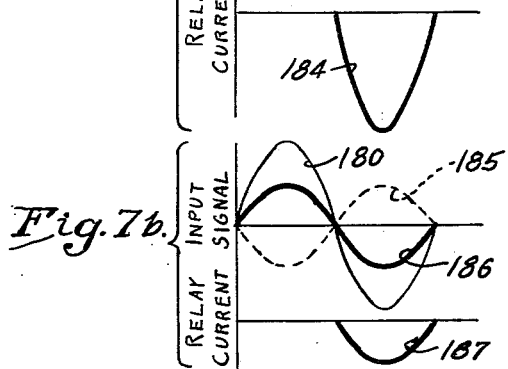
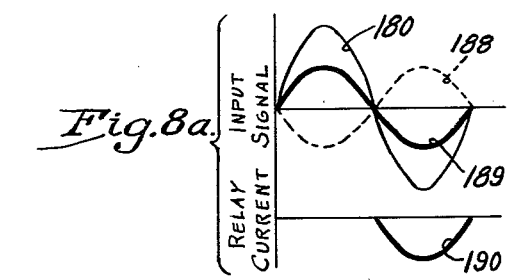
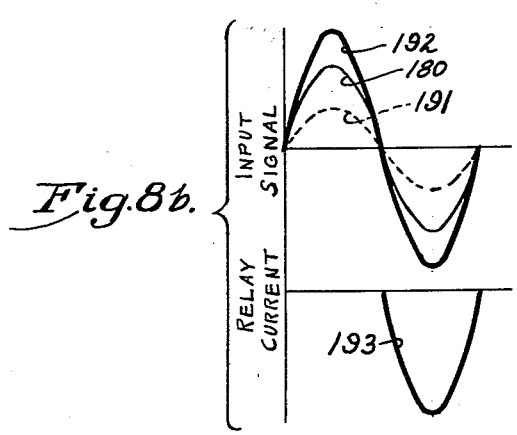
INVENTORS
William G. Young
Russell P. Sweger
Alfred A. Horton
BY Wolfe, Hubbard,
Voit & Osann
ATTORNEYS 3,050,257
Patented Aug. 21, 1962

3,050,257
MEANS FOR OPERATING A VALVE OR THE LIKE IN ACCORDANCE WITH A CONTROLLED CONDITION
Russell P. Sweger and Alfred A. Horton, Rockford, and William G. Young, Loves Park, Ill., assignors to Barber-Colman Company, Rockford, Ill., a corporation of Illinois
Filed Mar. 13, 1959, Ser. No. 799,274
5 Claims. (Cl. 236—74)

The present invention relates to condition control systems and more particularly to a combined control and power unit for use in connection with a radiator valve, damper element or the like.

It is an object of the present invention to provide novel condition control means which is distinguished by extreme compactness combined with a high degree of reliability. It is a related object to provide a novel control means intended for use with a radiator valve or the like which is characterized by use of a low power level and low current drain but which is nevertheless capable of developing large forces for the operation and positioning of a radiator valve and for overcoming any tendency for the valve or valve packing to stick, particularly after an extended period of non-use. It is a related object to provide a unitary valve operator incorporating an amplifier and driving means, which requires only connection to a remote condition sensitive element and A.-C. supply line, which may be mounted on the radiator, and which occupies only slightly more space than the motor and gear driving train conventionally employed to operate radiator valves.

It is a related object to provide a unitary valve operator employing a novel arrangement of parts, with the amplifier and motor assembly being "wrapped around" and supported by the hydraulic valve actuator.

It is another object to provide a novel amplifying arrangement including a transistor amplifier to obtain additional amplification and an hydraulic amplifier to develop large forces with a low power motor and without the necessity for using step-down gearing. It is a more specific object to provide a valve operator which employs a constantly running pump driven by a low torque A.-C. motor with electromagnetic means for varying the pressure applied to an associated hydraulic actuator, but which is capable of developing large total force with low control currents, permitting use of low power inexpensive transistor circuits. It is another specific object to provide a constantly running hydraulic control arrangement which is efficient, employing short, direct hydraulic connections and with minimum fluid friction except when such friction is intentionally employed for control purposes.

It is another object to provide a novel control arrangement for a valve or the like which is extremely simple, having a minimum number of parts, and which secures modulated control of the valve position without complex position feed-back arrangements conventionally resorted to in modulation systems. It is a related object to provide a control system which is stable, free of detenting, capable of precise control, and with rapid response to changes in the condition.

It is a further object to provide a condition control device which, despite use of a constantly running motor and pump, is capable of operating without care or maintenance over long periods of time. It is a related object to provide a valve operator consisting of but two control subassemblies, easy of access, and either of which may be removed and replaced in a few moments' time in the event that service becomes necessary.

In one of its aspects it is an object of the present invention to provide a hydraulic amplifier energized by a transistor amplifier and which is, of itself, of extreme compactness, devoting minimum space to a filtered power supply and capable of stable operation with large percentages of ripple in the nominally D.-C. portions of the circuit. It is another object to provide a control system for an integrated transistor amplifier which is sensitive to the phase as well as the magnitude of an A.-C. control signal. It is a more specific object in this connection to provide a control system having a phase-sensitive transistor circuit and employing an auxiliary A.-C. signal to establish the operating position of the flow control element which obtains at the control point.

It is still another object to provide a condition control arrangement for a radiator or heat exchanger particularly well suited for the controlling of hot water or the like in winter and a coolant in the summer. It is a related object to provide a temperature control unit which may be switched from winter operation to summer operation simply by reversing the phase of the alternating voltage which energizes the input circuit and without changing the effective control point. In this connection it is an object to provide a bridge circuit having a sensitive resistance element and so arranged that zero A.-C. signal voltage is produced at the control point but with an auxiliary A.-C. signal being injected to establish operation of the transistor amplifier in both directions along the steep portion of the transistor output characteristic.

Finally, it is an object to produce a compact unitary control device which may be produced at such low cost as to enable a separate complete control system to be used for each radiator employed in a controlled space thereby permitting zone control at a cost much less than that of conventional zone control arrangements.

Other objects and advantages of the invention will become apparent upon reading the attached description and upon reference to the drawings in which:

FIGURE 1 is a vertical section of a unitary control device constructed in accordance with the present invention;

FIG. 2 is a horizontal fragmentary section taken along the line 2—2 in FIG. 1;

FIG. 3 is a fragmentary section taken along the line 3—3 in FIG. 2;

FIG. 4 is a fragmentary section taken along the line 4—4 in FIG. 3 showing the gear pump profile;

FIG. 5 is a schematic diagram of the electrical portion of the device;

FIG. 6 shows the flow of current in the fluid relay in the absence of bridge input signal.

FIGS. 7a and 7b show the effects of increasing the temperature above the control point and decreasing the temperature below the control point, respectively, in the "winter" condition; and FIGS. 8a and 8b show the effects of decreasing the temperature below the control point and increasing the temperature above the control point, respectively, in the "summer" condition.

While the invention has been described in connection with the preferred embodiment, it will be understood that I do not intend to limit the invention to the embodiment shown but intend to cover the various alternative and equivalent arrangements which may be included within the spirit and scope of the appended claims.

Turning now to the drawings, FIGURE 1 shows a unitary condition controller 10 having a housing 11 which includes three subassemblies, namely, a transistor amplifier 12, a motor-hydraulic assembly 13 and a fluid actuator 14. The fluid actuator serves to mount the unit on a plunger operated valve 15 having a valve disk 16 cooperating with a valve seat 17. The fluid actuator 14 is cylindrical and of limited height having a diaphragm 20 connected to a downwardly extending plunger 21. The latter is slideably mounted in a cup-shaped insert 22 which is fitted into a cylindrical recess 23 formed in the underside of the housing 11. For the purpose of biasing the diaphragm to its upward position, a return spring 25 is used in the form of a double coil surrounding the plunger 21. The diaphragm 20 thus divides the space within the actuator into what may be termed a fluid chamber 26 and a spring chamber 27. It will be understood that when hydraulic fluid is forced into the fluid chamber 26, this causes the diaphragm 20 to compress the spring 25 thereby moving the plunger 21 downwardly to close the valve. For a given applied pressure, movement of the plunger will only take place until the reactive force of the spring equals the total fluid pressure acting upon the diaphragm, so that an equilibrium position of the valve will tend to be established until some change occurs in the fluid pressure.

In accordance with the present invention a constantly running pump is provided together with a novel fluid relay arrangement so that the output pressure of the pump which is applied to the actuator 14 varies in accordance with the current supplied by the transistor amplifier 12. In order to understand the pump and relay arrangement, reference is made to FIGS. 2, 3 and 4 which show pertinent fragmentary cross sections. Further in accordance with the invention, the motor-hydraulic assembly 13 includes an integral pump and fluid relay all integrally connected to the frame of the driving motor to form a unitary assembly in the shape of an inverted L. In the present embodiment the motor 30 has an upstanding core 31 having an offset field coil 32 at its lower end and an armature 33 extending transversely in its upper end. Comprising a part of the motor is a specially formed frame member 35 having a pair of pump gears 36, 37 recessed therein (FIG. 4). The gear 36 is driven directly by a motor armature, and the gear 37 is simply an idler in mesh therewith. For the purpose of conducting fluid from the pump, a port member 40 is provided secured to the frame member 35 by means of screws or the like and having an inlet port 41, an outlet port 42 and a control port 43, the latter being connected to the outlet port. For the purpose of controlling the pressure at the outlet, the control port 43 is controlled by a fluid relay 45. As illustrated, this relay extends off at right angles to the left of the motor and is rigidly secured to the port member 40.

In carrying out the invention, the fluid relay 45 includes an escape orifice which is directly coupled to the control port of the pump and which is controllably blocked by the action of the relay armature, thereby to vary the orifice back pressure and hence the output pressure of the pump. In the present device the relay includes a magnetic frame 46, a central magnetic core 47 of hollow construction terminating in an orifice 48, and a coil 49 surrounding the core. Extending flatly across the orifice 48 is the relay armature 50 which, for convenience, may be mounted on a spring hinge 51. In order to avoid any detenting effect, the armature-core circuit preferably includes an air gap 52 when the armature is in the fully closed, orifice-blocking position.

In accordance with one of the more detailed aspects of the invention, the armature is biased into the orifice-blocking position, and novel means are provided for adjusting the biasing pressure, thereby to adjust the input-output characteristics of the relay. In the present instance the adjustable bias is provided by an auxiliary spring 53 which is secured, cantilever fashion, to the outer surface of the armature and which reacts against an adjustable stop 54. It will become apparent as the discussion proceeds that simply by bending the adjustable stop 54 inwardly or outwardly, the response characteristics of the relay, i.e., the orifice established for a given relay current, may be conveniently changed.

Reference may be made at this point to the novel inter- fitting relation which contributes largely to the compactness and hence utility of the present device. Thus, while the housing 11 is in the form of a rectangular box, the cylindrical fluid actuator 14 is recessed into the bottom wall thereof, and a vertical partition indicated at 60 thus serves to divide the available remaining space into two compartments of inverted L shape. The motor-hydraulic assembly, which is also of L shape as previously noted, may be thus compactly nested with respect to the actuator to produce what may be termed a "wrap-around" construction in which substantially all of the available space is utilized, while providing extremely short hydraulic connections. Moreover, the L shaped compartment 11a is filled with fluid, preferably oil, up to the level 61 which not only serves as a fluid sump for the hydraulic system but also insures that the moving parts are constantly cooled and lubricated. Since the motor is constantly bathed in oil, it may be operated indefinitely without necessity for relubrication. The motor-hydraulic compartment is preferably sealed against the escape of fluid by a diaphragm 11d held in place by a cover 11c, the diaphragm being free to come and go as the level of the hydraulic fluid changes. The space above the diaphragm is suitably vented. Conveniently, the motor-hydraulic unit may be mounted on a pair of pedestals 62 and secured in place thereon by machine screws 63 (the fastening means at one end only of the motor being visible). Thus, following removal of the cover and diaphragm, the entire unit may be removed for replacement simply by unscrewing the screws 63.

The electrical portions of the device to be described (FIG. 5) may be similarly disposed on an L shaped chassis 65 to fill the available space and enclosed by a light access cover 11d.

Electrical Circuit

Having understood the motor drive and mechanical portions of the device, attention may next be given to the novel electrical circuit which controls the operation of the mechanical portion and which is coordinated therewith in a novel fashion to produce the desired over-all result. The circuit indicated generally at 100 (FIG. 5), may, for convenience, be viewed as a series of sub-circuits. The first sub-circuit is a bridge circuit 101 having a main sensitive resistor element 102 and an auxiliary element 103. The element 103 may, for example, by subjected to the outside ambient temperature to provide more precise control.

The second sub-circuit is the transistor input stage 104. The latter feeds into a second transistor stage 105 which controls the coil 49 of the fluid relay previously referred to. Direct voltage is supplied to the transistor circuit from a direct voltage supply 106 which is energized from the regular A.-C. line via terminals 107. As will be more fully understood as the discussion proceeds, the current in the relay coil 49 is established at a predetermined, steady-state value at the control point, i.e., at the desired temperature and with zero output signal from the bridge. As the temperature varies in one direction or the other, the relay current varies in one direction or the other from the steady-state value to produce corresponding positioning of the control member with correct action at the control valve.

With regard to the details of the bridge 101, the sensitive elements 102, 103 occupy diagonal positions in the bridge circuit. The remaining legs comprise resistors 112, 113. Also included in the bridge is a calibrating potentiometer 114 which is connected to a grounded output terminal 115, the signal output terminal being indicated at 116.

For the purpose of supplying the bridge with alternating voltage from the source 107, a transformer 120 is provided having a primary winding 121 and a secondary winding 122. As will be more fully disclosed, it is one of the features of the present control arrangement that it permits winter-summer operation. Thus the secondary winding 122 is divided into portions of positive and negative phase having terminals 123, 124, and a single pole, double throw switch 125 is provided to switch from one phase to the other. To adjust the magnitude of the signal voltage applied to the amplifier, a voltage divider is connected to the output terminal of the bridge consisting of a resistor 126 and potentiometer 127 having a slider 128.

With regard to the first transistor stage, this includes a transistor 130 having a base 131, an emitter 132, and a collector 133. In series with the emitter is an emitter resistor 134 which may have a value on the order of 10,000 ohms for maximum temperature stability. Direct voltage for operating the transistor is obtained from a power supply consisting of a transformer winding 140 on the transformer 120, a rectifier 141, and a smoothing capacitor 142. Voltage is produced between a negative output terminal 143 and a positive output terminal 144.

For the purpose of coupling the transistor stages together, a transformer 150 is used having a primary winding 151 and a secondary winding 152. A capacitor 153 is shunted across the primary winding 151 to improve the wave form. For maximum temperature stability of the second transistor stage, the secondary winding is preferably of extremely low D.-C. resistance, on the order of 8 ohms. The first transistor is biased to produce operation in a region of high signal amplification over a wide range of ambient temperature so that the voltage appearing across the secondary 152 of the coupling transformer consists of amplified alternating current, corresponding in phase but substantially greater in magnitude than the output voltage of the bridge.

Coupled to the transformer 150 is an output transistor 160 having a base 161, an emitter 162, and a collector 163. In order to make the transistor stage 105 phase sensitive, the collector 163 is supplied with half waves of A.-C. rectified by a rectifier 164 which is connected to the transformer winding 140. With regard to the bias of the second stage, such stage is preferably operated class B. Therefore, with no input signal, the output current is effectively zero. During the positive half cycle of the input current, the stage is driven into the class C range and is cut off further. Output current flows only during the negative half cycles. In series with the collector is the coil 49 of the fluid relay. To smooth out the half cycles of current and thus prevent chattering of the relay armature, the relay coil is shunted by a capacitor 165.

In accordance with one of the aspects of the invention, an auxiliary alternating voltage is applied to the input circuit of the transistor 160 so that even in the absence of signal voltage from the bridge (there being no bridge output signal at the control point) a steady-state current will exist in the relay coil 49. In the present instance the auxiliary voltage is applied to the input of the transistor 160 via a series resistor 166 connected to the transformer secondary 140. The voltage is injected in the primary of the coupling transformer 150. However, it will be understood by those skilled in the art that the voltage may be injected in the secondary of the coupling transformer if desired without substantially changing the operation of the circuit. The effect of the auxiliary voltage will be more fully appreciated in connection with FIGS. 6-8 to be discussed.

It is one of the features of the present device that direct voltage containing a large component of A.-C. ripple may be tolerated from the power supply 106 without adversely affecting the operation of the circuit. In accordance with the present invention the common positive bus of the amplifier circuit is floating rather than being grounded to the ground terminal of the detector circuit. To accomplish this floating action, a voltage divider consisting of resistors 171, 172 is provided at the output of the power supply having a common terminal 173 which is grounded. Moreover, arranged in series with the emitter in the input circuit is a capacitor 174 which has such a high capacity as to offer low impedance at the signal and ripple frequency. This capacitor may, for example, have a capacity of 30 microfarads. Because of a low A.-C. impedance of the capacitor the ripple voltages applied to the base and emitter are substantially equal in phase and magnitude and hence no amplification of the ripple can occur in the first stage. Moreover, the impedance of the primary winding 151 of the coupling transformer is purposely made very low, on the order of 500 ohms, compared to the relatively high output impedance of the transistor. Hence the ripple present in the half wave rectified bias supply has a very small effect on the collector impedance. No ripple problem is raised by the second transistor stage since this stage is not fed by the direct voltage supply. The net effect is that large amounts of ripple may be tolerated without affecting the operation of the circuit even though the filter capacitor 142, in the interests of extreme compactness, is of limited size and capacity.

Notwithstanding the lack of series resistance in the transistor input circuit, there is provision for applying direct bias between base and emitter. Such bias voltage is taken from across the capacitor 174, the amount of bias being such that operation takes place in a region of large signal amplification in spite of wide variations in transistor ambient temperature.

A further advantage brought about by use of the coupling capacitor 174 is that low impedances may be efficiently employed in the bridge and input circuits. Thus it will be noted that there is no series resistance in the transistor input circuit. The only series impedance is that provided by the capacitor 174 but since, at signal frequency, this impedance is extremely low, the bridge circuit "sees" only the base-emitter impedance of the transistor. With a low impedance operating into a low impedance, transfer efficiency is maximum.

*Description of Operation*

While the manner in which the above components and subassemblies cooperate with one another in order to produce the desired overall result will be apparent to one skilled in the art, nevertheless it will be helpful to describe the operation under the various typical circumstances. It will be assumed that the main temperature responsive element 102 is in the space to be controlled and the auxiliary element 103 is for the purpose of providing anticipation and reset, located in the outset ambient; however, in the description of the operation the auxiliary element 103 may be disregarded. It will further be assumed that the winter-summer switch 125 (FIG. 5) is in the "winter" setting and that steam, hot water or the like is flowing through the valve 15 to the associated radiator. Finally, it will be assumed that the temperature is at the control point, i.e., at 70°. To set the control point, the calibration potentiometer 114 may be adjusted so that at the desired temperature the output of the bridge circuit 101 appearing at terminal 116 is zero.

As described, it is one of the features of the present invention that at the control point, with zero output voltage from the bridge circuit, a predetermined steady state current is caused to flow in the relay 45 resulting from injection of the auxiliary A.-C. voltage. The relay current may, in a practical case, be about 12.5 milliamperes, sufficient to develop a midrange pressure in the hydraulic system and actuator, and thus sufficient to crack open the control valve to allow flow of the hot water or the other controlled medium into the radiator. Under such conditions, sufficient heating medium is admitted to make up for the losses from the controlled space, and hence the temperature tends to remain in the vicinity of the control point.

It will be helpful to refer to FIG. 6 which shows this "no signal" condition existing at the control point. The only signal being applied to the output transistor 160 under such circumstance is the auxiliary A.-C. voltage which is fed to the input of the transistor 160 through the resistor 166 (FIG. 5). While the resistor is shown connected to the primary of the transformer 150, a corresponding voltage will be developed across the transformer secondary and hence applied to the base or input circuit of the transistor. One cycle of input voltage is indicated at 180 in FIG. 6. Because of the action of the rectifier 164, only negative pulses 181 of current can flow through the transistor, and then only when current is flowing in the negative direction in the base of the transistor. It will thus be apparent that steady state current will flow in half-cycle pulses, and such half-cycle pulses have been shown in FIGS. 6, 7 and 8. However, such figures are diagrammatic and for the purpose of illustrating phase relationships. The actual current through the relay coil tends to persist between the half-cycles due to the storage action of the shunt capacitor 165.

To show the effect of an increase in the temperature of the control point, reference is made to FIG. 7a. An increase in temperature causes the bridge output appearing at terminal 116 to depart from zero in predetermined phase. The phase of the resulting bridge signal, shown at 182 and as applied to the input of the second transistor stage, is in such a direction as to coincide in phase with the auxiliary A.-C. signal, so that the effect is to increase the magnitude of the signal applied at the input of the second transistor to the value indicated at 183 in FIG. 7a. This produces a corresponding increase in the current 184 flowing through the coil of the relay 45. The increase in the current in the relay causes the armature 50 to be drawn down more tightly against the orifice 48, thereby increasing the back pressure in the hydraulic system and increasing the pressure existing in the actuator. The effect of this is that the diaphragm moves downwardly an incremental amount until the force behind it is opposed by an equal spring force, at which point further movement of the diaphragm will not take place. As a result, the valve disk 16 is moved toward the valve seat thereby further throttling flow of the water or other heated medium to the valve. The reduced flow results in a lowered radiator temperature and hence tends to counteract the change in the condition within the space which set the corrective cycle in motion.

The opposite corrective action takes place upon an assumed decrease in ambient temperature in the heated space. A decrease in temperature produces a bridge output voltage of opposite phase as indicated at 185 in FIG. 7b. The signal from the bridge thus tends to be subtracted from the auxiliary steady state A.-C. signal 180 to form a net input signal to the second transistor as indicated at 186. This decrease in the input signal results in a corresponding decrease in the output current as indicated at 187, so that the current through the relay becomes less than the steady state value. This causes the armature to be less strongly attracted, which tends to open the escape orifice 48 so that a lower pressure of fluid exists in the actuator, causing the valve plunger to move slightly in the upward direction until a force balance with the return spring is achieved. The effect is to open the valve an additional amount, thereby permitting fluid to flow to the radiator to bring the temperature of the controlled space back to the control point.

Analogous operation occurs during the summer season, assuming that coolant is to be circulated through the radiator, for example, in the form of cold water. To establish summer operation it is sufficient to throw the switch 125 to the "summer" position. It is to be noted that at the control point throwing the switch 125 from one position to the other has no effect upon the bridge output since the output in either event is zero. However, the result of throwing the switch is to change the phase so that the signal from the bridge, upon departure of temperature in a given direction, is in the opposite sense with respect to the auxiliary signal injected by the resistor 166.

Referring to FIG. 8a and assuming that the temperature in the space moves above the control point, the bridge signal 188 subtracts from the steady state signal 180 to produce a net signal 189 which produces a lowered value of current through the relay as indicated at 190. This brings about a decrease in the pressure within the actuator causing the valve 15 to be opened to admit additional coolant, thereby to restore the temperature to the control point. In the event the temperature drops below the control point, as in FIG. 8b, a signal 191 is produced which is in phase with the auxiliary injected signal to produce a net signal 192 at the input of the second transistor which results in an increased current 193 flowing through the relay. The effect of the increased current is to tend to throttle down the flow of coolant to the radiator, thereby permitting the temperature in the controlled space to increase back to the control point. Precise modulation is thereby achieved, with more accurate control than is afforded by rudimentary types of on-off radiator control devices. In other words, the present unitary control device, in the space of only a few cubic inches, accomplishes the same result as elaborate built-in and expensive systems. It is to be noted that modulated control is achieved with a minimum of parts and without necessity for a position follow-up or feedback linkage of the type used in conventional servo control systems.

While the device is distinguished by a low level of power in the amplifier circuits and use of a low-torque motor, nevertheless, experience has shown that forces may be developed at the valve plunger which are adequate to overcome friction or stickiness of the packing or sticking at the valve seat even after the device has been dormant for a period of several months. The reason for this is that the motor need not be capable of rapidly driving the diaphragm against the force of the spring but need only have the power to produce incremental movement of the diaphragm in the face of the minor changes in temperature which occur in the control of space temperature. Moreover, the relatively small displacement of the gear pump produces a powerful force-amplifying effect. Provided that a diaphragm of reasonable area is employed, operating forces may be developed which are even more powerful than the forces developed using a stepdown gear train and without danger of breaking or stripping the high-torque gears in the train. Moreover, it is to be noted that the mechanical complexity and loss due to friction, except for the intentional loss at the orifice for control purposes, is much lower than in conventional radiator control arrangements.

It has been found that a sufficiently high amplification factor can be achieved in the fluid relay so that the current load imposed upon the output transistor may be kept well within the rating of conventional transistors, i.e., no special "power" transistor need be used. All of the parts are employed well within their ratings so that the device may be expected to operate more or less indefinitely, electrically, as well as mechanically.

Nor is there any tendency for the control arrangement to become unstable in the face of high ambient temperatures as may exist around a steam-heated radiator. In the first place, the input transistor 130 is provided with an emitter resistor 134 having a value which is substantially greater than that conventionally used and which may, for example, be about 10,000 ohms. Thus, any changes in the emitter resistance brought about by changes in ambient temperature produce only a minor percentage change in the characteristics of the transistor and there is no danger of thermal "runway." While this involves some sacrifice in voltage gain, the voltage gain in the first stage is nevertheless adequate. In the second transistor stage, temperature stability is achieved by using a transformer 150 having a secondary with low D.-C. resistance, so that the base and emitter are kept effectively at the same D.-C. level. As a result the device as a whole may be operated at temperatures toward the upper level of the transistor temperature ratings but with perfect reliability as far as the transistor characteristics are concerned.

It will be apparent to one skilled in the art that the device described above satisfies the divergent space and performance requirements for effective radiator temperature control and may be manufactured at a sufficiently low cost to enable each radiator to be equipped with its own complete unit. Little or no maintenance is required. It will be apparent to one skilled in the art that the same unit may be employed for controlling a damper instead of a valve or may be used to control other conditions by a suitable change in the sensitive element without departing from the invention.

In the following claims the term "bellows" is intended to be generic applying to any diaphragm or bellows actuator having a sealed fluid compartment. The term "fluid relay" is intended to cover devices in which a change in current results in a change in the pressure applied to a hydraulic actuator. The term "back pressure" refers to the pressure which exists on the upstream side of the escape orifice.

We claim as our invention:

1. An automatic valve operator comprising in combination a cylindrical actuator having a plunger, a diaphragm in said actuator, a spring for pressing against said diaphragm, an outer enclosure secured to said actuator and therewith defining first and second compartments of L shaped cross section, a motor assembly including a motor having an integral gear pump and a fluid relay secured thereto extending at right angles to the motor in L shaped relation, said motor assembly being nestingly fitted in said first L shaped compartment, said fluid relay having a coil and armature and having an escape orifice with a direct connection to said fluid pump, said armature being arranged to block said orifice in accordance with the variable current flowing through said coil to produce a variable back pressure, a conduit for connecting the output of said gear pump to said fluid actuator so that the variations in said back pressure produce corresponding variations in the position of said plunger, and an amplifier for supplying said coil totally contained in said second L shaped compartment.

2. An automatic valve operator comprising in combination a constantly running drive motor having a motor frame, a gear pump including a pair of gears in said frame running in meshed engagement, means in said frame defining an inlet port and an outlet port, a fluid relay having a coil and a hollow magnetic core terminating in an orifice, said fluid relay being integral with said frame so that the outlet port communicates directly with the hollow magnetic core, said fluid relay having an armature for blocking said orifice, means providing an air gap in the magnetic circuit formed by the core and armature when the armature is in its fully blocking relation, a fluid actuator having a plunger and a fluid chamber, said fluid chamber being connected to the outlet port, a return spring for opposing movement of said plunger so that the plunger occupies a position dependent upon the current flowing in said coil, and means for supplying variable current to said coil.

3. An automatic valve operator comprising a housing, a cylindrical recess in the underside of the housing, a cup-shaped insert fitting into said recess, a plunger slideably mounted in said insert, a diaphragm covering the mouth of the insert for defining a fluid chamber for exerting pressure against said plunger, a return spring surrounding the plunger for reacting against said diaphragm, a constantly running motor in said housing having a frame and having a downwardly offset field portion adjacent said recess with the motor shaft above the level of said recess, a gear pump in said motor frame having an inlet and an outlet, a fluid relay integrally mounted on said motor frame at the output of the gear pump and in a position overhanging said recess, said fluid relay having a coil and armature and a fluid orifice blocked by the armature, means for energizing the coil with variable current thereby to vary the back pressure at the output of the gear pump, and a conduit for coupling the outlet of the gear pump to said fluid chamber, said housing being filled with fluid to a point above the inlet of said gear pump.

4. In an automatic valve operator for a radiator or the like having a reciprocable valve element, the combination comprising a hollow frame having provision for mounting on a radiator and having a movable diaphragm defining a pressure chamber on one side thereof and a spring chamber on the other side, a plunger coupled to the diaphragm and having provision for connection to the reciprocable valve element, a spring in the spring chamber for opposing movement of the diaphragm in response to entry of hydraulic fluid into the pressure chamber, said frame defining a motor chamber integral therewith immediately adjacent the pressure chamber and containing a body of hydraulic fluid, a constantly running motor in said motor chamber submerged in the fluid, said motor having a pump closely coupled thereto, said pump having an input connection for drawing fluid from said body of fluid and having an outlet connection connected to the adjacent pressure chamber, a fluid relay integral with said pump having an orifice connected to the outlet of the pump and having a movable armature for controllably blocking the escape of fluid from said outlet into said body of fluid thereby to vary the pressure of the fluid admitted to the pressure chamber, a temperature sensing device, an amplifier in said hollow frame but isolated from the motor chamber for applying a reference value of current to the relay when the temperature is at a desired control point and for varying the current above and below the reference value in accordance with variations in temperature thereby to produce corrective movement of the valve plunger for maintenance of a predetermined temperature condition.

5. In a temperature control system for a controlled space and having a member for controlling the flow of heat relative to the space, the combination comprising an A.-C. source, a bridge circuit including a temperature sensitive element and energized by said A.-C. source for production of a signal which varies in phase and amplitude in accordance with the direction and magnitude of the departure of the temperature from a desired control point, an amplifier having an input and an output with the input being coupled to said bridge, means for supplying the amplifier output circuit with half waves of A.-C. from said source, a fluid relay having an orifice and an armature for controlling escape of fluid from the orifice, said fluid relay being connected in the amplifier output circuit so that the current flowing in said relay varies in accordance with the temperature, a fluid actuator having a return spring, a constantly running motor permanently connected to the A.-C. source, said motor having close-coupled thereto a fluid pump having its output connection connected to the orifice of said fluid relay and to said actuator so that the pressure in said actuator varies in accordance with the current in said relay, said amplifier being so constructed and arranged that a steady state reference current exists in said fluid relay at the control point and in the absence of a signal from said bridge circuit, and means for selectively reversing the phase of the alternating voltage supplied to the bridge circuit thereby to reverse the direction of movement of the flow controlling member when departure of the temperature occurs in a given direction from the control point for winter-summer operation at the same control point independently of making any change in the circuit other than said selective reversal of phase.

(References on following page)

References Cited in the file of this patent

UNITED STATES PATENTS

| | | | |
|---|---|---|---|
| 1,582,462 | Giesler | Apr. 27, | 1926 |
| 1,984,558 | White | Dec. 18, | 1934 |
| 1,989,829 | Specht | Feb. 5, | 1935 |
| 2,118,248 | Keinath | May 24, | 1938 |
| 2,267,215 | Ray | Dec. 23, | 1941 |
| 2,366,500 | Eastin | Jan. 2, | 1945 |
| 2,401,861 | Cunningham | June 11, | 1946 |
| 2,412,218 | Hilmer | Dec. 10, | 1946 |
| 2,488,780 | Ray | Nov. 22, | 1949 |
| 2,588,522 | Harris | Mar. 11, | 1952 |
| 2,742,916 | Side | Apr. 24, | 1956 |
| 2,751,753 | Ray | June 26, | 1956 |
| 2,827,020 | Cook | Mar. 18, | 1958 |
| 2,837,104 | Side | June 3, | 1958 |
| 2,871,376 | Kretzmer | Jan. 27, | 1959 |
| 2,872,595 | Pinckaers | Feb. 3, | 1959 |
| 2,908,829 | Schaeve | Oct. 13, | 1959 |
| 2,974,237 | Ehret | Mar. 7, | 1961 |